United States Patent
Dong

(10) Patent No.: US 8,257,853 B2
(45) Date of Patent: Sep. 4, 2012

(54) BATTERY COVER ASSEMBLY AND PORTABLE ELECTRONIC DEVICE UTILIZING THE SAME

(75) Inventor: Shui-Jin Dong, Shenzhen (CN)

(73) Assignees: Shenzhen Futaihong Precision Industry Co., Ltd., ShenZhen, Guangdong Province (CN); FIH (Hong Kong) Limited, Kowloon (HK)

( * ) Notice: Subject to any disclaimer, the term of this patent is extended or adjusted under 35 U.S.C. 154(b) by 184 days.

(21) Appl. No.: 12/731,238

(22) Filed: Mar. 25, 2010

(65) Prior Publication Data
US 2011/0076536 A1   Mar. 31, 2011

(30) Foreign Application Priority Data
Sep. 29, 2009   (CN) .......................... 2009 1 0307964

(51) Int. Cl.
*H01M 2/10*   (2006.01)

(52) U.S. Cl. .............................. 429/97; 429/96; 429/100
(58) Field of Classification Search ............ 429/96–100, 429/121–347; 455/575.1–575.8; 379/433.08
See application file for complete search history.

(56) References Cited

U.S. PATENT DOCUMENTS
2008/0096617 A1 *   4/2008   Hwang et al. .............. 455/575.1
2009/0303668 A1 *   12/2009   Zhao et al. ............... 361/679.01
* cited by examiner

*Primary Examiner* — Basia Ridley
*Assistant Examiner* — James Lee
(74) *Attorney, Agent, or Firm* — Altis Law Group, Inc.

(57) ABSTRACT

A portable electronic device includes a base, a battery cover defining a notch, and a latching module. The base has two latching tabs. The latching module comprises an operating element, and two latching element fixed on the battery cover. The operating element is slidably received in the notch. When the operating element slides towards the battery cover, the two latching elements separate from corresponding latching tabs.

8 Claims, 7 Drawing Sheets

US 8,257,853 B2

BATTERY COVER ASSEMBLY AND PORTABLE ELECTRONIC DEVICE UTILIZING THE SAME

BACKGROUND

1. Technical Field

The exemplary disclosure generally relates to a battery cover assembly and a portable electronic device utilizing the battery cover assembly.

2. Description of Related Art

Batteries are widely used in portable electronic devices, such as personal digital assistants (PDAs), mobile phones, and so on. Often, batteries are attachably received in the electronic device, and battery covers provided to connect with housings of the electronic devices to secure the batteries. Batteries are replaced by opening the battery covers when, for example, the batteries are damaged and/or dead (i.e. no longer rechargeable).

Although battery cover assemblies may be simple, the engagement between the battery cover and the housing of the mobile phone can be too strong to allow easy detachment thereof.

Therefore, there is room for improvement within the art.

BRIEF DESCRIPTION OF THE DRAWINGS

Many aspects of the exemplary battery cover assembly can be better understood with reference to the following drawings. The components in the drawings are not necessarily drawn to scale, the emphasis instead being placed upon clearly illustrating the principles of the portable electronic device. Moreover, in the drawings, like reference numerals designate corresponding parts throughout the several views, in which.

DETAILED DESCRIPTION

Figure 1:
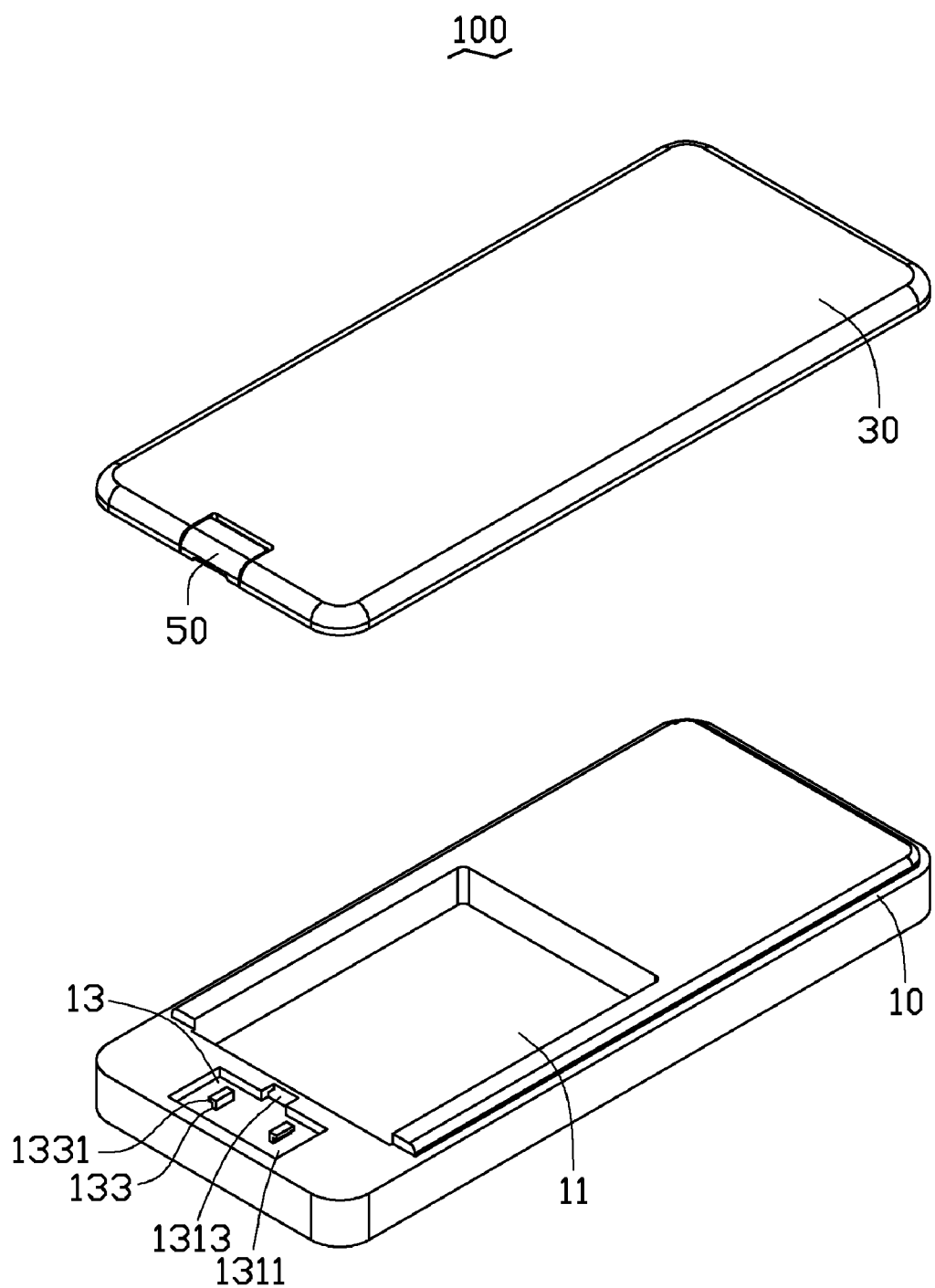
FIG. 1 is an exploded, isometric view of an exemplary embodiment of a portable electronic device as disclosed.

FIG. 1 is an exploded, isometric view of an exemplary embodiment of a portable electronic device 100 as disclosed, here exemplified as a mobile phone. The mobile phone is an exemplary application, for the purposes of describing details of an exemplary embodiment of a battery cover assembly. The battery cover assembly includes a base 10, a battery cover 30 configured to cover the base 10, and a latching module 50 attached to the battery cover 30.

The base 10 is part of the portable electronic device 100, and defines a chamber 11 for receiving a battery (not shown) therein. The base 10 forms a latching portion 13 adjacent to the chamber 11. The latching portion 13 defines a receiving slot 1311 and forms two spaced-apart latching tabs 133 extending upwards in the receiving slot 1311. One side of the receiving slot 1311 defines a cutout 1313 communicating with the receiving slot 1311. Each of the latching tabs 133 has a resisting protrusion 1331 extending perpendicular therefrom.

Figure 2:
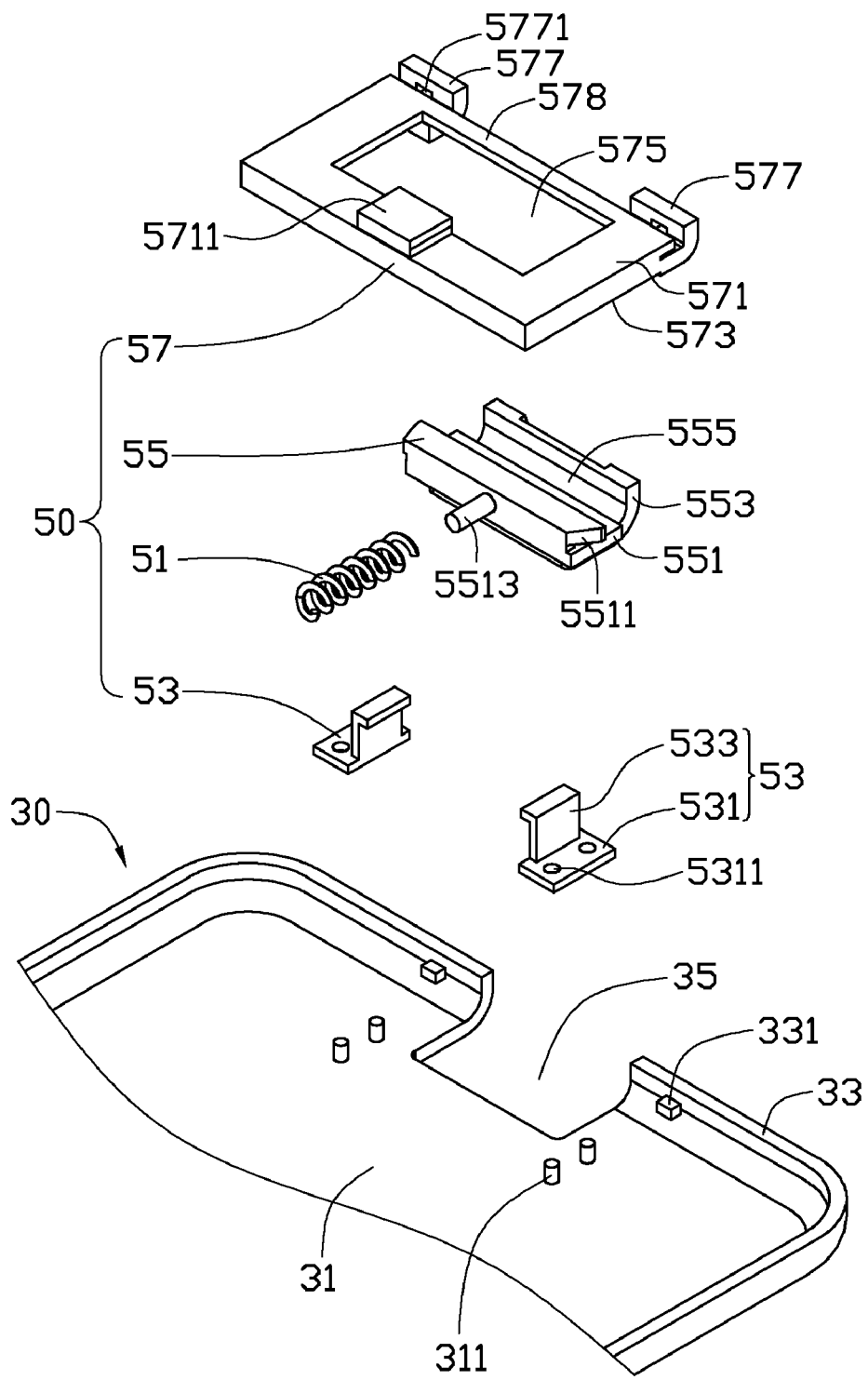
FIG. 2 is an exploded, isometric view of an exemplary embodiment of a battery cover as disclosed and a latching module thereof.

Referring to FIG. 2, the battery cover 30 has a back plate 31 and a sidewall 33 protruding from an edge of the back plate 31. The battery cover 30 defines a notch 35. Two spaced-apart posts 311 extend upwards on two sides of the notch 35 from the back plate 31. The sidewall 31 has a block 331 at the two sides of the notch 35.

The latching module 50 includes an elastic element 51; two latching elements 53 configured to engage the latching tabs 133 of the base 10; an operating element 55 slidably received in the notch 35 of the battery cover 33; and a frame 57 attaching the latching module 50 to the battery cover 30. In the exemplary embodiment, the elastic element 51 is a helical spring providing elastic force to the latching module 50. The two latching elements 53 each have a positioning portion 531, and an L-shaped hook 533 protruding therefrom. Each positioning portion 531 defines two spaced-apart receiving holes 5311 therein receiving the corresponding posts 311 of the battery cover 30.

Figure 3:
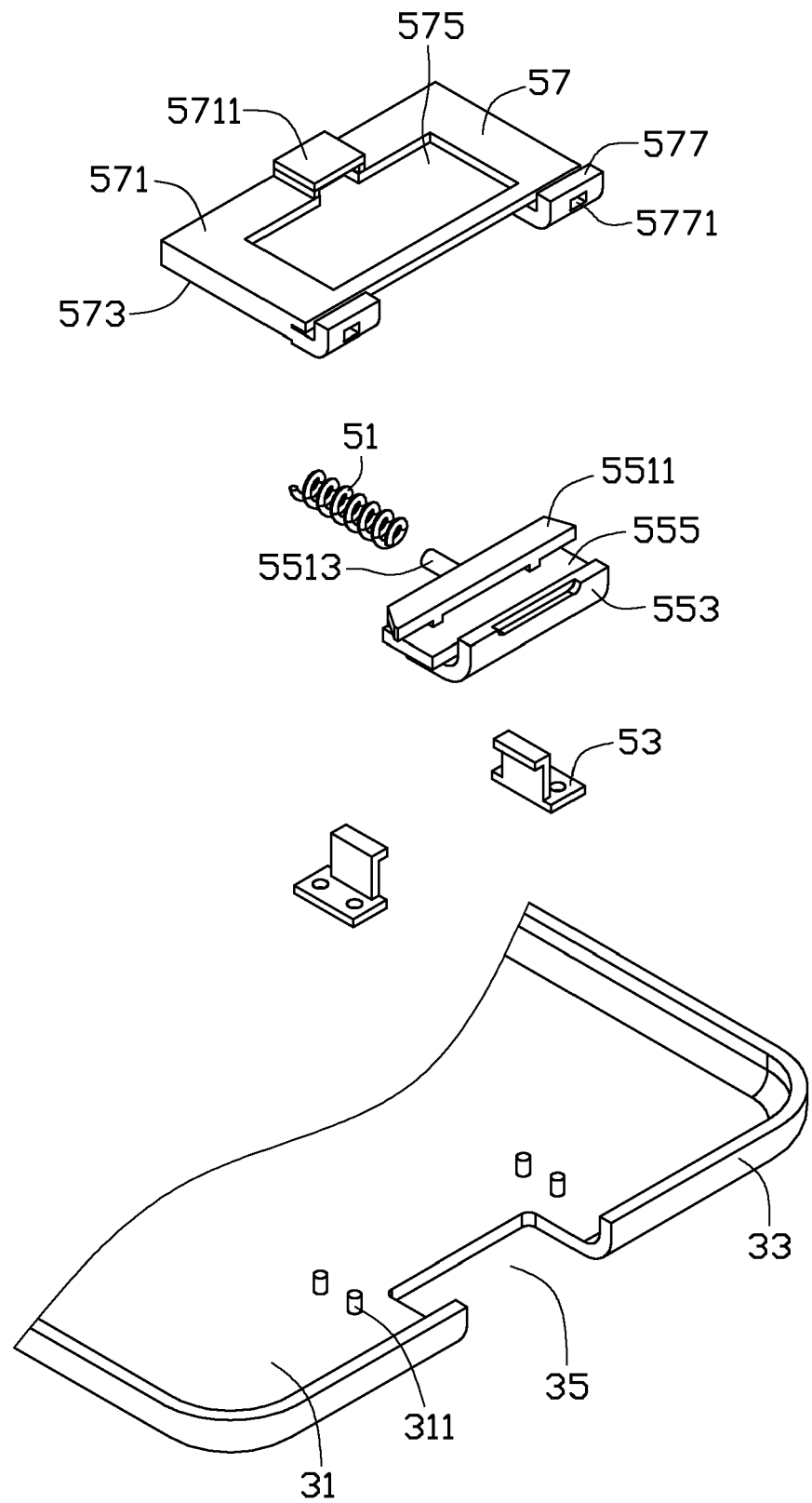
FIG. 3 is similar to FIG. 2, but viewed from another aspect.

Referring to FIG. 3, the operating element 55 includes a resisting portion 551, and an operating portion 553. The operating portion 553 extends from the resisting portion 551 and the end opposite to the operating portion 553 is approximately L-shaped. The operating element 55 defines a receiving space 555 between the resisting portion 551 and the operating portion 553. The resisting portion 551 forms a beveled flange 5511 at two sides thereof. The resisting portion 551 forms a pin 5513 at one end thereof received in the elastic element 51.

Figure 4:
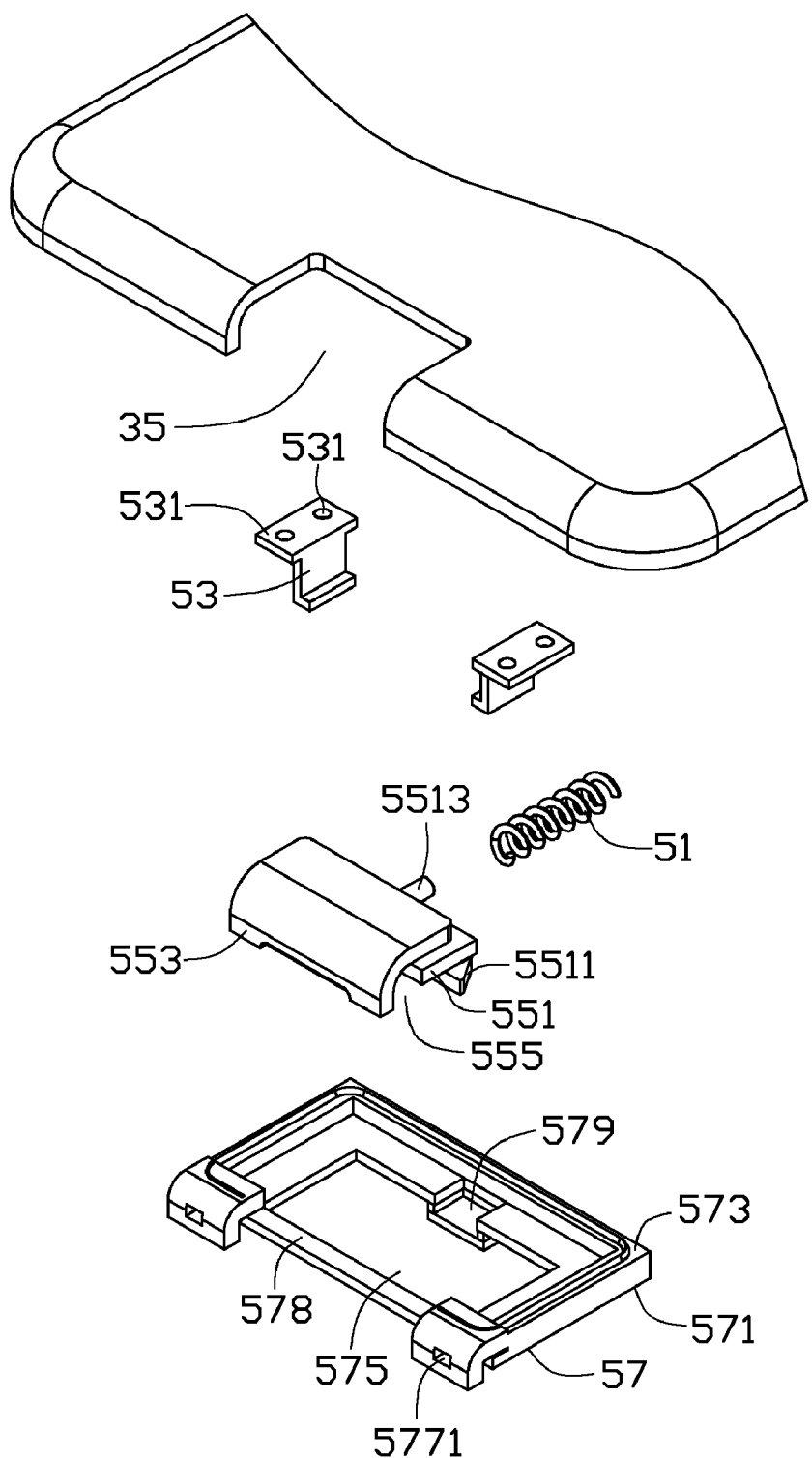
FIG. 4 is similar to FIG. 3, but viewed from another aspect.

The frame 57 includes a first surface 571 and a second surface 573 opposite to the first surface 571. The frame 57 defines an opening 575 therethrough and forms a bar 578. An approximately rectangular protrusion 5711 protrudes from the first surface 571 of one end of the frame 57, and two spaced-apart positioning portions 577 extend from the other end of the frame 57. Each positioning portion 577 defines a receiving cavity 5771 configured for receiving a corresponding block 331 of the battery cover 30. The frame 57 defines a space 579 opposite to the protrusion 5711, as shown in FIG. 4. The space 579 communicates with the opening 575 and is configured to receive the elastic element 51.

Figure 5:
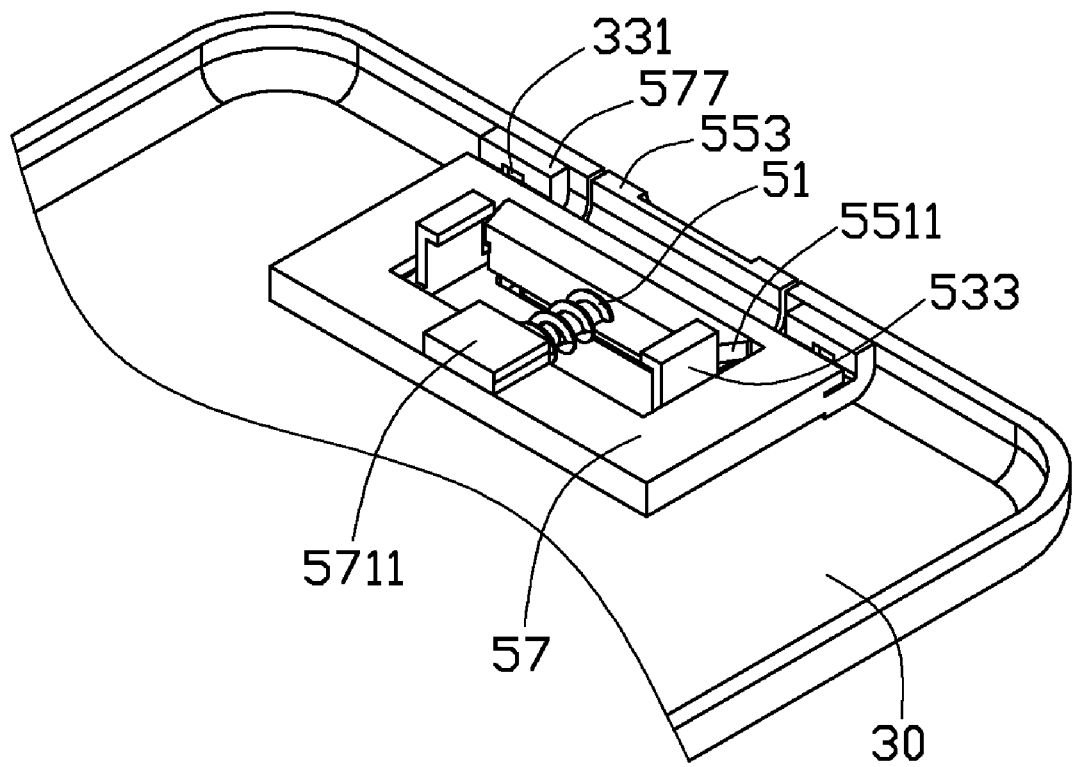
FIG. 5 is a partially assembled view, showing the latching module attached to the battery cover.
Figure 6:
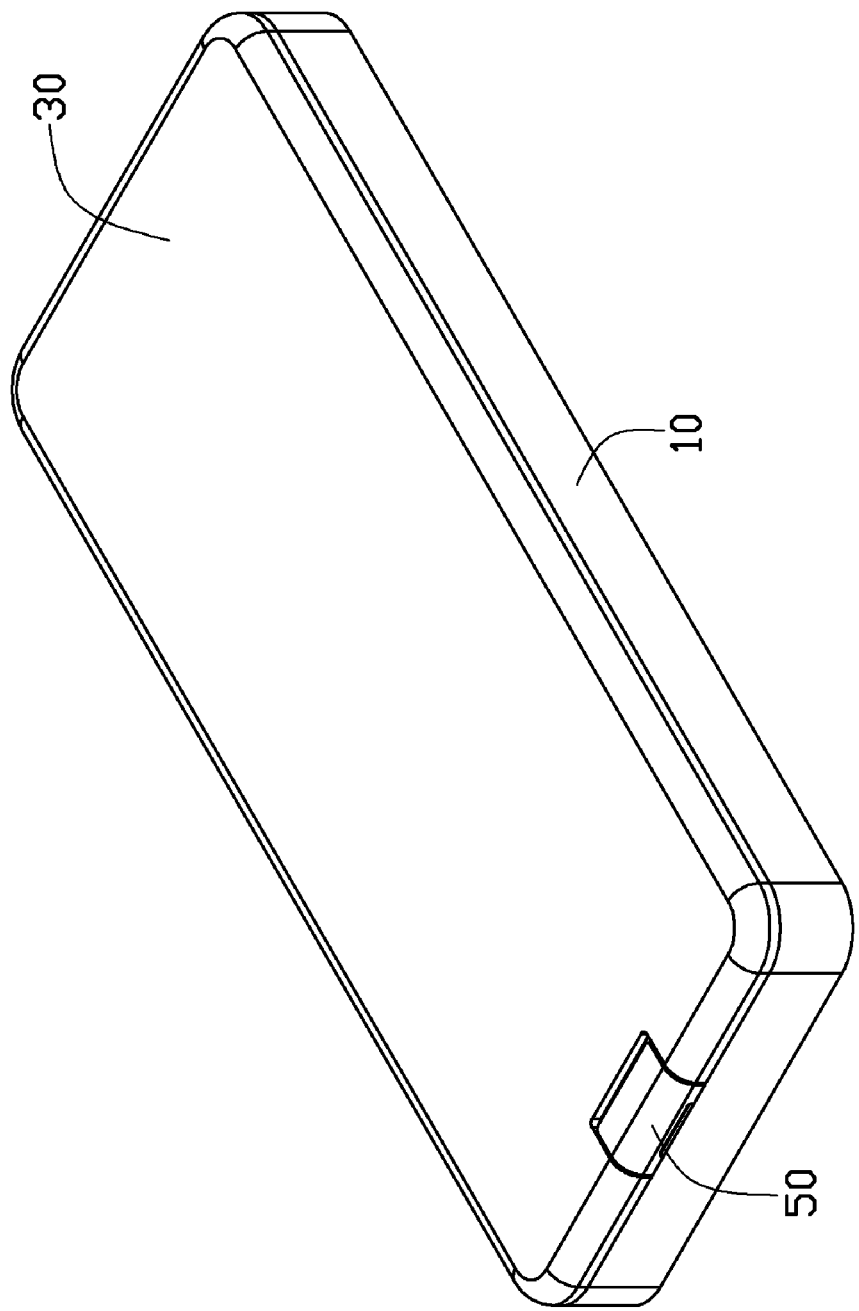
FIG. 6 is an assembled view of the portable electronic device of FIG. 1.

Referring to FIG. 5, during assembly of the portable electronic device 100, firstly, the two latching elements 53 are located on the battery cover 30. The posts 311 are respectively received in the receiving holes 5311. The elastic element 51 and the operating element 55 are placed on the frame 57. One end of the elastic element 51 is received in space 579 and the other end is coiled around the pin 5513, and the resisting portion 551 is slidably attached to the frame 57. The frame 57 is fixed to the battery 30. The blocks 331 are each received in a corresponding receiving cavity 5771. At the same time, the hooks 533 pass through the opening 575, and the operating element 55 is movably received in the notch 35 of the battery cover 30. Finally, the battery cover 30 is latched with the latching module 50 with the base 10. The hooks 533 engage the corresponding latching tabs 133 such that battery cover 30 covers the base 10. And the protrusion 5711 passes through the receiving slot 1311 and is received in the cutout 1313. Thus, the portable electronic device 100 is assembled, as shown in FIG. 6.

Figure 7:
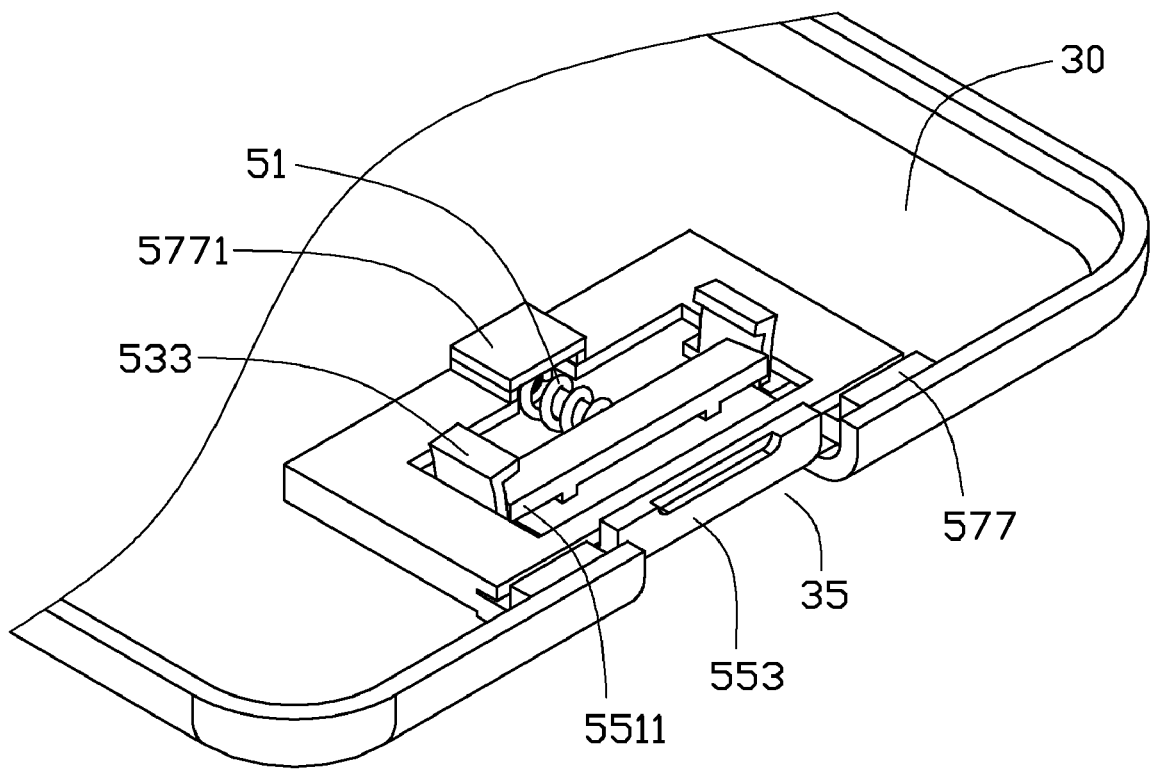
FIG. 7 is similar to FIG. 5, but shows the latching module moved relative to the battery cover.

Referring to FIG. 7, when a battery is to be changed or installed, the operating element 55 is moved towards the protrusion 5711, the resisting flange 5511 abuts the hooks 533 which spread accordingly, such that each leaves a corresponding latching tab 133, and battery cover 30 is released from the base 10. With elastic element 51 in an elastically deformed state, operating element 55 rebounds after release by the elastic force of the elastic element 51.

It is to be understood, the number of latching elements 53 is not limited to two, with the number of latching tabs 133 changing to match; and additionally, the latching module 50 may be integrally formed with the battery cover 30 by insertion molding; and the protrusion 5711 and the space 579 can be omitted.

The portable electronic device 100 includes two latching elements 53 latching with the latching tabs 133 to fix the battery cover 30 to the base 10, and movement of the operating element 55, removes the battery cover 30 from the base 10 quickly and easily.

It is believed that the present embodiments and their advantages will be understood from the foregoing description, and it will be apparent that various changes may be made thereto without departing from the spirit and scope of the disclosure or sacrificing all of its material advantages, the examples hereinbefore described merely being preferred or exemplary embodiments of the disclosure.

What is claimed is:

1. A battery cover assembly comprising:
   a base comprising a latching tab;
   a battery cover;
   an elastic latching element fixed on the battery cover, and an operating element slidably attached to the battery cover;
   a frame attached to the battery cover, locating the latching element and the operating element thereon;
   an elastic element, one end of which elastically resists the frame and the other end of which elastically resists the operating element;
   wherein the latching element comprises a hook engaged with the latching tab, the operating element comprises a resisting portion having a beveled resisting flange formed at an edge of the resisting portion, the beveled resisting flange comprises a bevel adjacent to the hook, when the operating element moves relative to the battery cover, the beveled resisting flange slides relative to the hook along the bevel and the bevel resists the hook to separate from the latching tab.

2. The battery cover assembly as claimed in claim 1, wherein the operating element comprises a pin, the frame defines a space; and one end of the elastic element is coiled around the pin and the other end received in the space.

3. A portable electronic device comprising:
   a base comprising two latching tabs;
   a battery cover defining a notch; and
   a latching module;
   a frame attached to the battery cover, locating the latching element and the operating element thereon;
   an elastic element, one end of the which elastically resists the frame and the other end of which elastically resists the operating element;
   wherein the latching module comprises an operating element and two latching elements engaging with the two latching tabs and fixed on the battery cover, the operating element comprising a resisting portion having two beveled resisting flanges formed at two opposite edges of the resisting portion is slidably received in the notch, each beveled resisting flange comprises a bevel adjacent to the latching element, when the operating element slides towards the battery cover, the beveled resisting flange slides relative to the latching element along the bevel allowing the latching element to slant away from the other latching element and separating the latching element from the latching tab.

4. The portable electronic device as claimed in claim 3, wherein the operating element comprises a pin, the frame defines a space; and one end of the elastic element is coiled around the pin and the other end of the elastic element is received in the space.

5. A battery cover assembly comprising:
   a base comprising two latching tabs;
   a battery cover defining a notch;
   two opposite elastic latching elements fixed on the battery cover, and
   a frame fixed on the battery cover, the frame defining an opening, the latching elements extending through the opening;
   an operating element slidably received in the notch of the battery cover and the opening of the frame;
   an elastic element, the operating element comprises a pin, the frame defines a space communicating with the opening; one end of the elastic element is coiled around the pin and the other end of the elastic element is received in the space;
   wherein each latching element engages with the latching tab, the operating element comprises a resisting portion having two beveled resisting flanges formed at two opposite edges of the resisting portion, when the operating element moves relative to the battery cover and the frame, the two beveled resisting flanges push the two elastic latching elements toward opposite sides allowing the two elastic latching elements to be away from each other and separating the latching elements from the latching tabs.

6. The battery cover assembly as claimed in claim 5, wherein a protrusion opposite to the space protrudes from one end of the frame, and two spaced-apart positioning portions extend from the other end of the frame.

7. The battery cover assembly as claimed in claim 6, wherein the battery cover further comprises two opposite blocks located at two sides of the notch, each positioning portion defines a receiving cavity configured for receiving the block of the battery cover.

8. The battery cover assembly as claimed in claim 7, wherein each latching element comprises a hook engaged with the latching tab, the hook passes through the opening.

\* \* \* \* \*